(12) United States Patent
Hartmann et al.

(10) Patent No.: US 6,244,506 B1
(45) Date of Patent: *Jun. 12, 2001

(54) UNIT COMPRISING DATA MEMORY CARD AND READING/WRITING DEVICE

(75) Inventors: Georg Hartmann, Köln; Gunnar Weikert, Düsseldorf; Patrick Horster, Frechen, all of (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 179 days.

(21) Appl. No.: 08/690,442

(22) Filed: Jul. 26, 1996

(30) Foreign Application Priority Data

Aug. 2, 1995 (DE) .............................. 195 28 297

(51) Int. Cl.[7] ........................................ G06K 5/00
(52) U.S. Cl. ............................ 235/380; 235/382
(58) Field of Search ................... 235/380, 379, 235/492, 494, 382, 375; 340/825.31–825.35

(56) References Cited

U.S. PATENT DOCUMENTS

| 4,650,978 | 3/1987 | Hudson et al. . |
|---|---|---|
| 4,777,354 | 10/1988 | Thomas . |
| 4,801,787 | * 1/1989 | Suzuki .................................. 235/380 |
| 5,223,699 | * 6/1993 | Flynn et al. ........................ 235/380 |
| 5,264,689 | 11/1993 | Maes et al. . |
| 5,397,881 | * 3/1995 | Mannik .............................. 235/380 |
| 5,401,945 | 3/1995 | Buschmann et al. . |

FOREIGN PATENT DOCUMENTS

| 14922/83 | 11/1984 | (AU) . |
|---|---|---|
| 42 29 863 A1 | 3/1994 | (DE) . |
| 44 22 682 A1 | 1/1995 | (DE) . |
| 0 330 404 | 8/1989 | (EP) . |
| 0 378 454 | 7/1990 | (EP) . |
| 0 437 616 | 7/1991 | (EP) . |
| 2 503 423 | 10/1982 | (FR) . |
| 2 685 520 | 6/1993 | (FR) . |

\* cited by examiner

Primary Examiner—Thien M. Le
(74) Attorney, Agent, or Firm—Norris, McLaughlin & Marcus, P.A.

(57) ABSTRACT

A description is given of a method of extending the period of validity of smart cards, without the cards having to be surrendered by their owner. For this purpose, use is made of reading/writing devices which are installed near smart card users and, by extension passwords sent to the owner by a central issuing agency, extend the date of validity of the smart card.

16 Claims, 3 Drawing Sheets

UNIT COMPRISING DATA MEMORY CARD AND READING/WRITING DEVICE

BACKGROUND OF THE INVENTION

Personal data carrier cards, which have an electronically readable data carrier in the form of a magnetic memory, a chip memory or an optical memory area, are used diversely as access-authorization cards, credit cards, debit cards (for example phone cards) or cards for health insurance finds. Furthermore, it has recently been repeatedly proposed to utilize the high storage capacity of optical memory cards (Optical Memory Card=OMC) or hybrid cards (Optical Memory Chip Card=OMCC) to store personal data in encoded form, in particular medical information, in a format you can take with you all the time—so-called smart cards.

The usability of such card systems depends on the existence and maintenance of a not inconsiderable infrastructure of reading/writing devices, which have to be maintained by the card users.

The cards are therefore in each case issued by the companies making the cards and the necessary infrastructure available in return for a user fee for a limited amount of use, the cards containing information on the authorized amount of use and losing their validity once the amount of use has been used up. In this case, the amount of use may be defined by a period of use, defined by an expiry date, or by an intensity of use, for example frequency of use, or a value of the card, which is stored in the card and is updated each time it is used (residual value).

The amount of use of the card is respectively extended by making available a new card, the old card becoming invalid.

This revalidation process is no longer economical, for reasons of cost alone, if the body of the card itself is of a technically complex design, for example in the form of an optical memory card, a chip card comprising a plurality of chips or in the form of hybrid optical memory chip cards. In addition, liquidation of the old card is ruled out if it serves for storing personal data, for example medical data, since the stored data are lost in the liquidation. Sending in the card for revalidation by the company making it available is likewise ruled out, since the card would not be available during the revalidation period and there are objections from the point of view of data protection rights.

There is therefore a need for a method of revalidating cards in an off-line process in which the card on the one hand remains with the user and on the other hand improper, unauthorized revalidation can be reliably ruled out.

SUMMARY OF THE INVENTION

It is proposed according to the invention to carry out the revalidation of the card by the card user himself with the aid of a revalidation password sent by the card-issuing agency and individualized for the respective card. For this purpose, it is necessary to design both the card and the reading/writing devices in a specific way.

The subject of the present invention is a unit comprising data memory card 1 and at least one reading/writing device 2, it being possible for the card 1 to be read from and/or written to by the reading/writing device 2 only during a defined, extendable interval of use (the validity) and it being possible for the period of validity of the card 1 to be extended by means of an extension password (VEC) related to the card, which unit is characterized by the following features:

a) the card has a1) a memory area on which a code IC individualizing the card is stored, a2) a memory area on which a further code VC, which characterizes a limited validity, is stored, and a3) a memory area DF as the actual data carrier area;

b) at least one reading/writing device, which b1) has recognition programs R/IC, RIVC for the individualizing code IC and the validity code VC, b2) has access to a database Date, CV, which characterizes the already used validity of the card, b3) has a program which, on the basis of a comparison of the database Date, CV with the validity code VC, either rejects the card as invalid or activates a reading/writing program for the actual memory area DF; and c) at least one reading/writing device, which in addition to feature b1) has:

c1) a recognition program for an extension password VEC and c2) a program for processing the extension password VEC with the individualizing code IC and/or the validity code VC for generating the new validity code nVC and also c3) means for writing the new validity code nVC to the memory area for the validity code VC, it being possible for the reading/writing devices according to b) and c) to be integrated in a single device.

The method for making the card available and revalidating it using the unit according to the invention, comprising card and reading/writing device, can be carried out as follows:

The card is made available for the first time with an authorized amount of initial use stored in the memory area of the card for the validity code VC. With each use of the card, the remaining residual amount of use or the validity of the card is checked. Within a predefined, remaining residual amount of use, the card holder is notified of a revalidation password VEC by the card-issuing agency in return for payment of the revalidation fee by the said card holder. During subsequent use, i.e. input of the card into a reading/writing device, the revalidation password is entered into the reading/writing device and the revalidation of the card is performed by the reading/writing device.

In this arrangement, it may be provided that the revalidation password is sent in the form of a sequence of figures and/or letters which can be read in plain text, which is then read into the reading/writing device via a keyboard, or else in the form of a cheap electronically readable revalidation card, only designed for one-time use, which is either pushed into an additional reading slot of the reading/writing device or is pushed into the single reading slot in alternation with the card to be revalidated.

Whenever the respectively authorized amount of use is defined by a time period of use, the database Date is preferably made available by a calendar clock which cannot be manipulated and is integrated into the reading/writing device. It may preferably be a radio-controlled standard-time clock.

Whenever the respectively authorized amount of use is defined by an intensity of use, for example a number of acts of use or a prepaid amount of monetary value, the database for determining the still authorized residual amount of use CV is integrated into the card and is updated with every use, i.e. every time the card is pushed into the reading/writing device, on the basis of the use which has taken place.

The invention is explained in more detail below with reference to the attached figures:

DETAILED DESCRIPTION OF THE INVENTION

Figure 1:
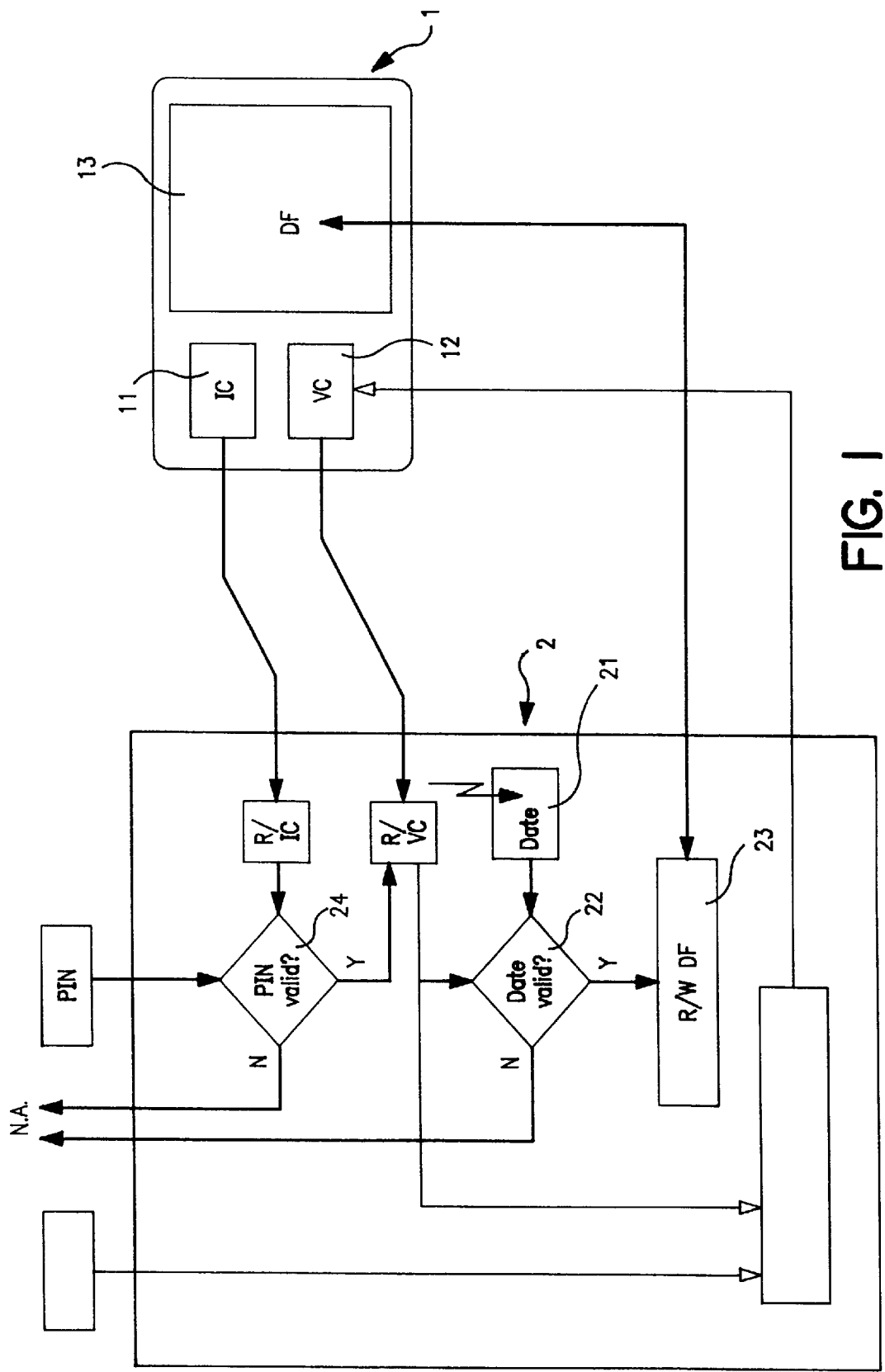
FIG. 1 shows a unit comprising card and reading/writing device in the case of an authorized amount of use defined by a time period of use, for explaining the procedure of using the card.

In FIG. 1, the card 1 and the reading/writing device 2 are schematically represented. The card has a first memory area 11 for the storage of the code IC individualizing the card, a second memory area 12 for the storage of the validity code VC and a third memory area 13 for receiving the actual information content DF of the card. If the card 1 is, for example, a personal card for storing medical information, it would be possible each time the doctor is visited for the memory area 13 to be read, for providing the medical prehistory, and for additional diagnoses, therapy and prescriptions etc. to be stored by means of reading/writing devices 2 installed in the doctor's practice.

The memory areas 11 to 13 may be designed in the form of one or more electronic chips arranged on the card or in the form of laser-readable, optical memory areas. In the case of so-called hybrid cards, the memory areas 11 and 12 may be designed in the form of an electronic chip which has additional cryptogrphic programs and the memory area 13 may be designed in the form of an optical memory area.

The reading/writing device 2 has a recognition program R/IC for reading the code IC individualizing the card and a recognition program R/VC for recognizing the validity code VC. Furthermore, a radio-controlled calendar clock 21 is integrated into the reading/writing device. After pushing the card 1 into the device 2, the codes IC and VC are decoded by the programs R/IC and R/VC and the period of validity of the card, determined from the validity code VC, is compared with the calendar database Date by means of a comparison program 22 provided in the device 1. In the event that the card is invalid, the card is rejected NA via the path N. In the event that the card is valid, the reading/writing program for the memory area 13 is activated via path Y.

Furthermore, it may be provided that, once the card 1 has been pushed into the device 2, a personal identification number of the card holder PIN is entered into the reading/writing device via a keyboard, the authorization for card use being checked by means of a comparison program 24.

Figure 2:
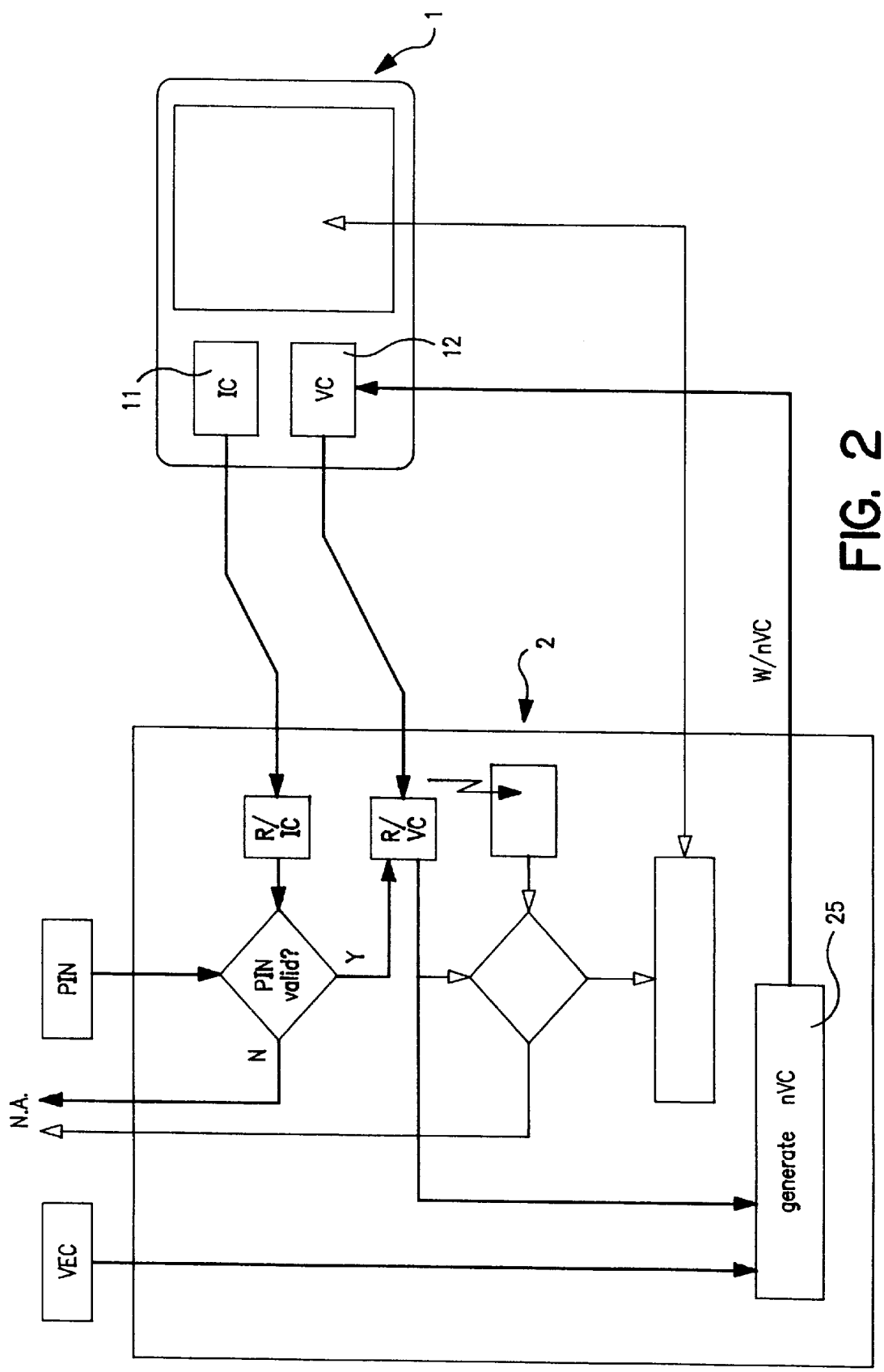
FIG. 2 shows a unit according to FIG. 1 for explaining the revalidation.

As can be seen from FIG. 2, the reading/writing device 2 further has a program 25, which by processing the extension password VEC, entered for example via the keyboard, with the code VC and/or IC, generates a new validity code. nVC, which is written to the memory area 12.

The reading/writing devices according to FIGS. 1 and 2 may be all-in-one devices which allow both use of the card (as in FIG. 1) and revalidation (as in FIG. 2). In the event that they are separate devices, the elements respectively not emphasized need not be present.

Figure 3:
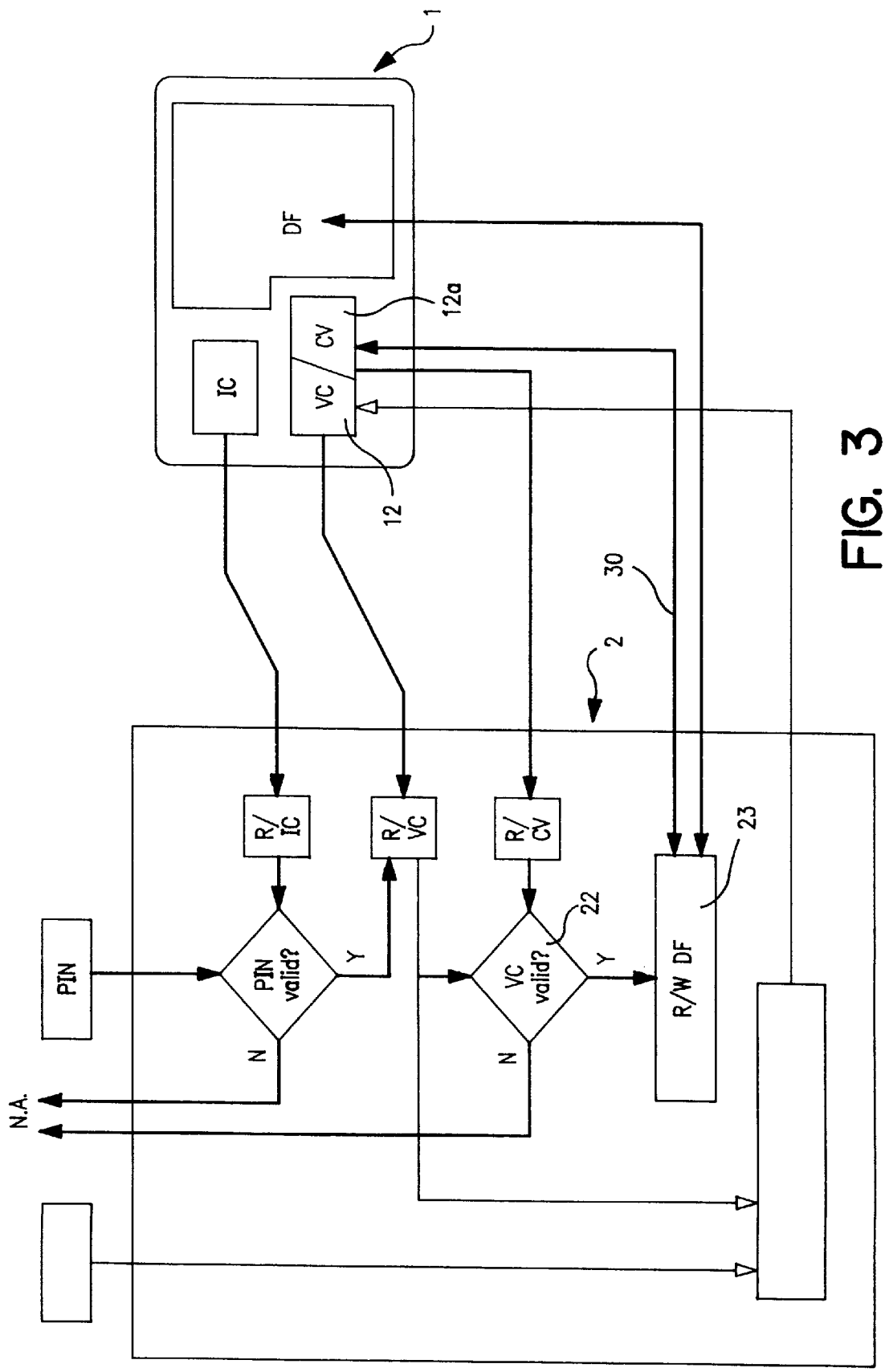
FIG. 3 shows a unit according to FIG. 1, the authorized amount of use being defined by an intensity of use.

In the case of an authorized amount of use defined by the intensity of use, according to FIG. 3 the database CV is provided for the determination of the residual validity of the card 1 in a memory area 12a of the card. The reading/writing device 2 contains a recognition program R/CV for the code CV, which characterizes the amount of use used up so far. With every use of the card, the code CV is at the same time updated—as indicated by arrow 30—by the reading/writing program 23. The revalidation takes place in a way corresponding to FIG. 2.

What is claimed is:

1. A unit comprising:
   at least one data memory card having at least one data memory area for storing data, an individualizing code uniquely identifying the at least one data memory card and a limited validity code representing a limitation on the usage of the at least one data memory card;
   at least one device for writing in the at least one data memory area of the at least one data memory card;
   at least one device for reading the at least one data memory area of the at least one data memory card to obtain the individualizing code and the limited validity code therein;
   wherein one of the at least one device for reading and the at least one device for writing receives from a user a personal identification number associated with the individualizing code of the at least one data memory card to determine if usage of the at least one data memory card is valid; and
   wherein one of the at least one device for reading and the at least one device for writing receives from a user an extension password associated with the individualizing code of the at least one data memory card; and
   wherein the device for writing writes a new limited validity code into the at least one data memory area representing an extended limitation on the usage of the at least one data memory card for future use thereof by the user.

2. The unit according to claim 1, wherein the at least one device for reading and the at least one device for writing are integrated in a single device.

3. The unit according to claim 1, further comprising a non-manipulatable calendar clock integrated into one of the at least one device for reading and the at least one device for writing and wherein the limited validity code represents a time period of validity.

4. The unit according to claim 3, wherein the calendar clock is a radio-controlled standard time calendar clock.

5. The unit according to claim 1, wherein the at least one memory area stores data representing accumulated actual use of the card and is updated by the device for writing each time the card is used.

6. The unit according to claim 1, wherein the at least one memory area is an optical memory.

7. The unit according to claim 1, wherein the at least one memory area is a memory on a chip.

8. The unit according to claim 1, wherein the at least one memory area is an optical memory and a memory on a chip.

9. A method for using a data memory card having at least one data memory area for storing data, comprising the steps of:
   writing in the at least one data memory area of a data memory card an individualizing code uniquely identifying the data memory card and a limited validity code representing a limitation on the usage of the data memory card;
   associating a personal identification number with the individualizing code of a data memory card;
   using a data memory card by reading the at least one data memory area of the data memory card to obtain the individualizing code and the limited validity code thereof and receiving the personal identification number from a user to determine if usage of the data memory card is valid; and extending a limitation on the usage of a data memory card by associating an extension password with the individualizing code of the data memory card, reading the at least one data memory area of the data memory card to obtain the individualizing code thereof, receiving the associated personal identification number and extension password from the user and writing a new limited validity code into the at least one data memory area representing an extended limitation on the usage of the data memory card for future use thereof by the user.

10. The method according to claim 9, wherein the steps of reading and writing are carried out in a single device.

11. The method according to claim 9, further comprising providing a non-manipulatable calendar clock for providing a time reference and wherein the limited validity code represents a time period of validity.

12. The method according to claim 11, wherein the calendar clock is a radio-controlled standard time calendar clock.

13. The method according to claim 9, wherein the at least one memory area stores data representing accumulated actual use which is updated upon each use.

14. The method according to claim 9, wherein the at least one memory area is an optical memory.

15. The method according to claim 9, wherein the at least one memory area is a memory on a chip.

16. The method according to claim 9, wherein the at least one memory area is an optical memory and a memory on a chip.

\* \* \* \* \*